May 1, 1928.
A. L. MOLER
1,668,082
JOURNAL LUBRICATING DEVICE
Filed July 28, 1925　　3 Sheets-Sheet 1
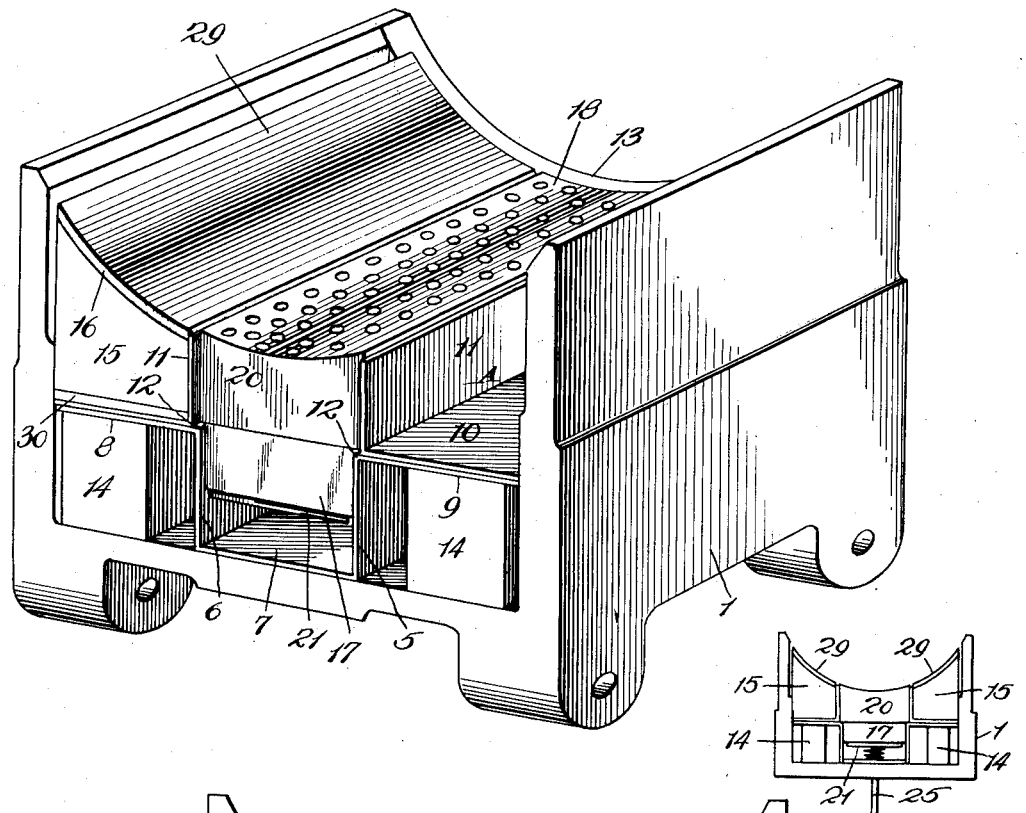
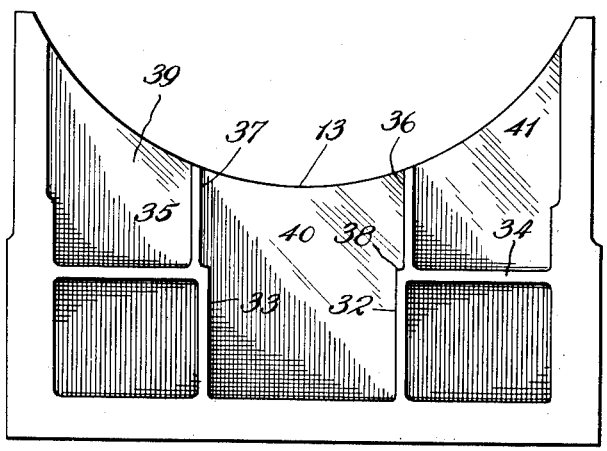

May 1, 1928. 1,668,082
A. L. MOLER
JOURNAL LUBRICATING DEVICE
Filed July 28, 1925 3 Sheets-Sheet 2

Inventor
Abraham L. Moler
By Edwin S. Clarkson
Attorney

May 1, 1928.  
A. L. MOLER  
1,668,082  
JOURNAL LUBRICATING DEVICE  
Filed July 28, 1925  
3 Sheets-Sheet 3

Inventor
Abraham L. Moler
By
Ewers S. Clarkson
Attorney

Patented May 1, 1928.

1,668,082

UNITED STATES PATENT OFFICE.

ABRAHAM L. MOLER, OF RICHMOND, VIRGINIA, ASSIGNOR OF ONE-HALF TO JOHN W. SMALL, OF RICHMOND, VIRGINIA.

JOURNAL-LUBRICATING DEVICE.

Application filed July 28, 1925. Serial No. 46,626.

One of the many problems in operating a railroad is proper lubrication and this is especially true in connection with locomotives because the cost of renewing burnt journals in locomotives amounts to approximately three hundred ($300.00) dollars, and as this is of frequent occurrence it will be appreciated that such renewals amount to a very considerable sum in one year.

With the various types of lubrication devices now generally in use in the event of a lack of lubrication, there is no known practical expedient that an engineer on the road can resort to and consequently he is obliged to run in without lubrication which results in a damaged journal and bearings.

One of the objects of my invention is to provide a lubricating attachment which will enable an engineman to keep the journals efficiently lubricated under all conditions, thereby eliminating injury to the journals and also eliminating the expensive replacing of journals and bearings.

Under the present system of lubrication which (prior to my invention) was believed by mechanical officers of all railroads to be the best, the average miles per pound of lubrication is about one hundred.

From actual use of my lubricating device on locomotives in actual service the railroads are getting thirteen hundred miles per pound of lubricant, in addition to which it is equally important to note, that there has not been a single instance reported of damage or hot journals and this is of very material consideration.

Another object of my invention is to provide means to lubricate journals efficiently, conserve grease, to prevent a surplus of grease being fed to the crown brass of locomotive journals, to provide a means to keep the main supply of grease from constant contact with the journal.

Another object of my invention is to provide means whereby my improved device may be used in grease cellars of different depth.

Another object of my invention is to provide a lubricating device which may be substituted for those now in use without changing the grease cellars.

Another object of my invention is to provide a lubricating device which permits of a circulation of air on one side of the journal which tends to keep the journal cool at all times, and with these and other objects in view my invention consists of the parts and combination of parts as will be hereinafter more fully pointed out.

In the drawings:

Figure 1 is a perspective view of a grease cellar (parts being removed) showing my improved lubricating device in position.

Figure 2 is a front elevational view of a cast grease cellar embodying my invention.

Figure 7 is an elevation of another embodiment of my invention.

Figure 3:
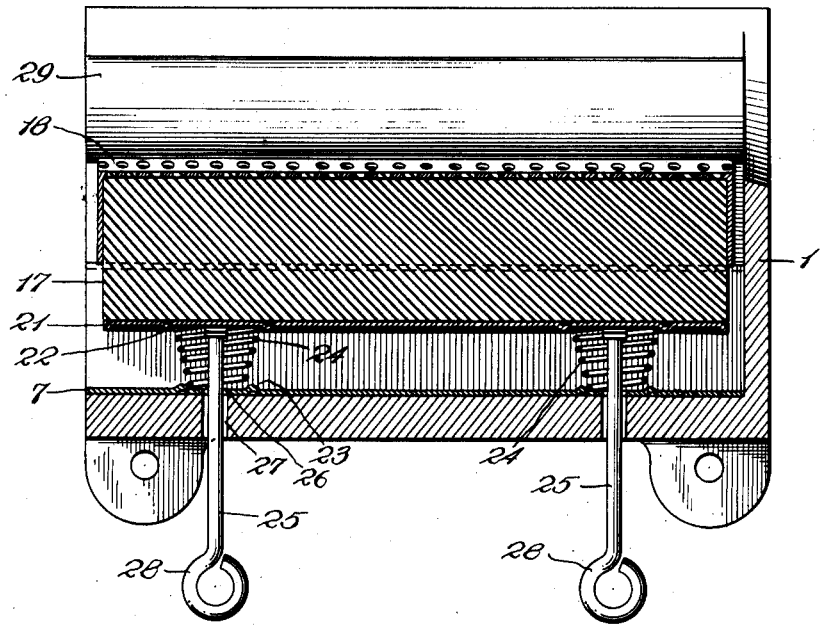
Figure 3 is a central longitudinal vertical section of Figure 1.
Figure 4:
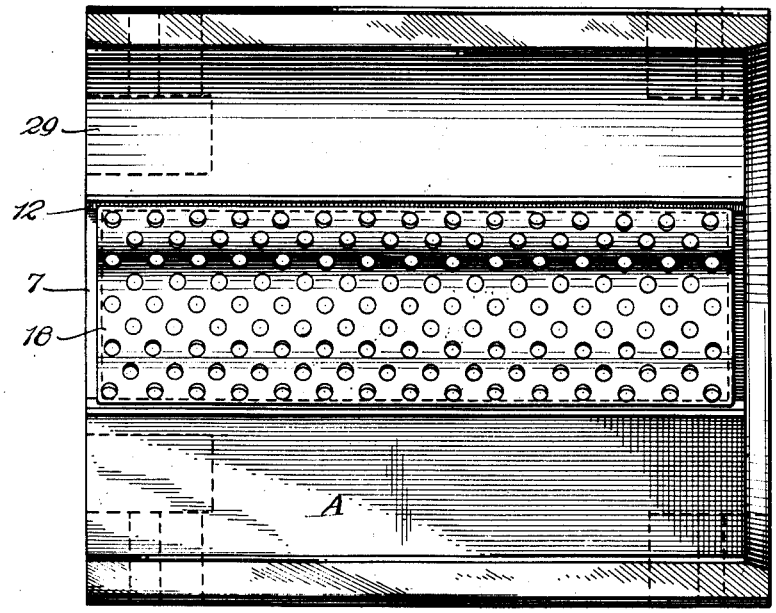
Figure 4 is a top plan view of Figure 1.
Figure 5:
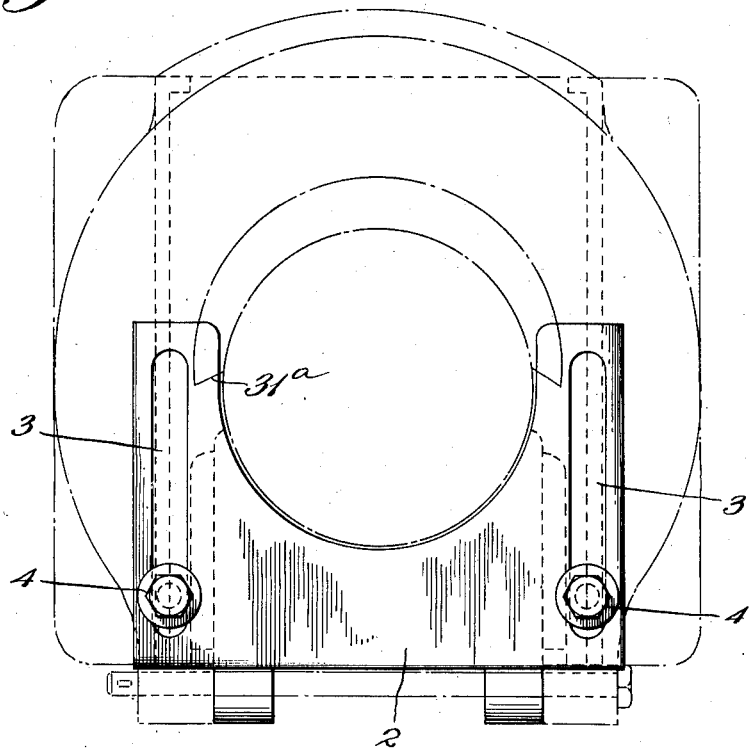
Figure 5 is a front elevation of a grease cellar.

The reference numeral 1 designates an oil cellar of approved dimension and exterior contour which is standard. These cellars are provided with the front plate 2 having the elongated slots 3 through which the bolts 4 project whereby the plate may be adjusted as near as possible to the journal without rubbing the journals. The length of the slots 3 is to be sufficient to permit the removal of the grease cake when the plate is dropped to its lowermost position. The bolts 4 are cap screw and are provided with lock nuts which lock the plate 2 in position.

To adapt my lubricating device for use with the standard grease cellar now in use without necessitating any structural change in the cellar, I provide a central substantially U shaped chamber having side walls, 5, 6, and a bottom wall 7. At the upper end of the side walls 5 and 6 I provide laterally outwardly extending flanges 8 and 9 at right angles to the side walls. Substantially L shaped members consisting of a bottom wall 10 and a side wall 11 are suitably secured to the flanges 8 and 9 by spot welding, preferably, or by any other desired or appropriate manner; it will be noted that the bottom wall 10 of the L shaped member is not as wide as the flanges 8 and 9 so that when the L shaped members and the flanges 8 and 9 are secured together with their outer edges flush, a shoulder 12 is formed at the top of the walls 5 and 6.

Some standard cellars are of different depth than others from the top of the concave wall 13 to the bottom of the cellar but in all instances the top of the wall 13 must clear the journal one eighth of an inch. Now my lubricating device is made standard and in order to maintain it and the lubricant in a predetermined and standard position relative to the top of the wall 13 I provide blocks 14 of suitable material and of different heights on which the flanges 8 and 9 may rest to support the parts in the proper and required positions.

On top of the flange 8 I place a block 15 which is also held between the flange 11 and one of the side walls of the cellar, said block having a concaved top face 16 the lower edge of said face 16 being in a horizontal plane, normally, below the upper edge of the flange 11 as clearly shown in Figures 1 and 6 for a purpose which will be hereinafter explained.

Over the top of the grease cake 17 is placed a cap comprising a concaved perforated top plate 18 having integral imperforate side walls 19 and end walls 20 whereby the grease is prevented from coming into contact with the journal in excess except through the perforations in the top plate 18 which results in a very material saving in grease and prevents an over supply of grease.

The grease cake cap is limited in its downward movement by the lower edges of the walls 19 and 20 of the cap coming in contact with the shoulders 12.

Within the central chamber, formed by the side walls 5 and 6 and bottom wall 7 I mount a plate 21 on which the grease cake 17 rests (see Figure 3) said plate having spring seats 22 formed on its under face which are in alignment with the springs seats 23 formed in the bottom wall 7 of the central chamber. Springs 24 are secured in said seats and tend to force the grease cake 17 upward as will be readily understood.

Grease gages 25 are secured at their upper ends to the follower plate 21 and project through the aligned openings 26 in the bottom wall 7 and 27 in the bottom of the grease cellar and project below the grease cellar in full view so that anyone examining the cellar to ascertain whether or not it needs a new cake of grease can easily determine this by a mere glance at the gage rods 25. If the eyes 28 are up to or near the bottom of the cellar the attendant knows that a new cake of grease should be installed, and in this event the lock nuts, on the bolts 4 are backed off thus freeing the plate 2 to slide downward, whereupon the grease cap with what is left of the grease cake is withdrawn by sliding it on the shoulders 12 and the cap is placed on a new grease cake and slid into position on the shoulders 12.

Figure 6:
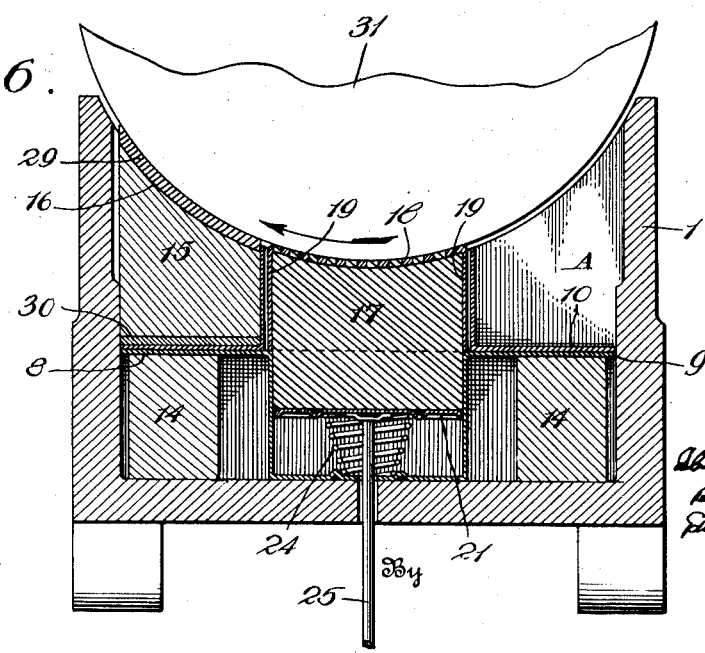
Figure 6 is a vertical transverse section through Figure 4.

When the device is first installed in a grease cellar, I pack grease 29 on the concave face 16 on the upper end of the blocks 15 in a comparatively thick layer, with the lower edge of said layer resting against the upper portion of the wall 11 as clearly shown in Figures 1 and 6. This layer of grease 29 when applied is probably about one quarter inch thick, but for running conditions it must not be more than one eighth of an inch thick. After the grease layer 29 is applied I force a shim 30, approximately one eighth of an inch thick, between the bottom of the block 15 and the bottom wall 10 of one of the L shaped members (see Figures 1 and 6) thereby elevating the block 15 and packing the grease 29 between the journal 31 and the concave face 16 and reducing said layer 29 to one eighth of an inch in thickness, which thickness is the proper one for efficient service. In compressing this layer of grease 29 the surplus grease is forced between the journal and the concave top 18 of the grease cake cap which, in actual practice it has been found, slightly depresses the grease cake and its cap and holds the plate from contact with the journal until such time that the remaining surplus grease has been taken up by the journal from the layer 29 after which the perforated plate 18 again contacts with the journal.

By reason of the spring follower plate 21 holding grease cap 18 in contact with journal, the revolving journal forms a partial vacuum which draws the needed amount of grease through perforated cap 18, and this grease keeps the journal constantly lubricated the journal being also in wiping contact with the grease layer 29 on the block 15. If a surplus of grease extrudes through perforated plate 18 and is taken up by the journal it is wiped from the journal by the lower tip 31ᵃ on the crown brass thereby preventing a surplus of grease feeding to the crown brass.

It will be noted that the block 15 and the grease layer 29 are behind the journal (see arrow Figure 6 indicating the direction of rotation of the journal.)

The space A in front of the journal within the grease cellar permits of a free circulation of air therethrough, thus materially cooling the journal.

The blocks 14 (which extend the full length of the grease cellar) in addition to maintaining the attachment at the proper height in the cellar, also function to prevent the attachment from tipping in the cellar as will be readily understood, thereby maintaining the grease surfaces in definite and proper relation to the journal and insuring proper lubrication at all times and under all service conditions.

The attachment shown in Figures 1, 3, 4 and 6 is designed for use with grease cellars already installed on locomotives so that a railroad may use my improved lubricator without removing or scrapping their cellars.

In new equipment I prefer to cast the grease cellar as shown in Figure 2 wherein the walls 32, 33, correspond with the walls 5 and 6 (Figure 1) and the shelves 34, 35, correspond with the flanges 8 and 9, and the walls 36, 37, correspond with the walls 11 (Figure 1) while the shoulder 38 corresponds with the shoulder 12 (Figure 1). The block 15 would be placed in the chamber 39, Figure 2, and the grease cake would be placed in the chamber 40 (Figure 2) as heretofore described. The follower plate 21, springs 24, and gages would be in the chamber 40 (Figure 2) as shown in Figure 3. In Figure 2 the air chamber is designated by the reference numeral 41.

If through neglect the grease cake is not renewed at the proper time and this is not discovered until the locomotive is out on a run, and it is found that the journal is becoming heated, it is only necessary for the engineman to remove the block 15 and pack the space it occupied as well as air space in opposite side with oil saturated waste which will sufficiently lubricate the journal to protect it from damage until a new grease cake can be obtained and placed in position.

In Figure 7 I have shown, on a reduced scale, a grease cellar embodying my invention, especially adapted for use on engines operating in both directions, such for instance as switching engines and engines used in surburban service. In this figure it will be seen that I use a block with its grease supply on each side of the grease cake, so that the necessary lubrication is supplied irrespective of whether the engine is running forward or backward.

I am aware that changes may be made in the construction and relative arrangement of parts without departing from the scope of the appended claims.

What I claim is:

1. In a grease cellar, a central compartment, adapted to receive a grease cake, a side compartment adapted to receive an auxiliary grease supply and another side compartment adapted to supply air to a journal mounted in said cellar.

2. In a grease cellar, a central compartment, adapted to receive a grease cake, a side compartment adapted to receive an auxiliary grease supply and another side compartment adapted to supply air to a journal mounted in said cellar, said auxiliary grease compartment being to one side of said journal.

3. An attachment for a grease cellar, comprising a central compartment, outwardly and laterally extending flanges at the top of said compartment, substantially L shaped plates secured to said flanges and means to support a grease cake in said central compartment.

4. An attachment for a grease cellar, comprising a central compartment, outwardly and laterally extending flanges at the top of said compartment, substantially L shaped plates secured to said flanges and means to support a grease cake in said central compartment, and a block having a concaved upper end and positioned on one of said L shaped frames.

5. A lubricating attachment for grease cellars, comprising a central compartment, a spring impelled follower plate in said compartment, gages extending from said plate, shelves extending outwardly from said compartment, a block having a concaved upper end mounted on one of said shelves, and means to support a grease cake in said compartment.

6. A lubricating attachment for grease cellars, comprising a central compartment, a spring impelled follower plate in said compartment, gages extending from said plate, shelves extending outwardly from said compartment, a block having a concaved upper end mounted on one of said shelves, and means to support a grease cake in said compartment, and blocks adapted to be placed under said shelves.

7. A lubricating attachment for grease cellars, comprising a central compartment, a spring impelled follower plate in said compartment, gages extending from said plate, shelves extending outwardly from said compartment, a block having a concaved upper end mounted on one of said shelves, means to support a grease cake in said compartment, and blocks of varying height adapted to be placed under said shelves.

8. A grease cellar provided with side, bottom and end walls, the upper edge of said end walls being concave and formed to be disposed about a journal; means in said cellar extending from the bottom upwardly so as to terminate adjacent the upper concave edges of said end walls, and providing a central compartment, and additional means extending laterally at points below the top of and from said central compartment to provide relatively shallow side compartments.

9. In a device of the character described, the combination with a journal; a grease cellar provided with side, bottom and end walls, the upper edges of said end walls being concave and formed to be disposed about said journal; of means in said cellar extending from the bottom upwardly so as to terminate adjacent said concave upper edges of said end walls, providing a central compartment, additional means extending laterally from said central compartment to provide relatively shallow side compartments one on each side and of a length corresponding to the length of the central compartment, lubricating means mounted in said central compartment for vertical movement into contact with said journal; and means normally urging said lubricating means toward said journal.

10. In a device of the character described, the combination with a journal; of a grease cellar comprising side, bottom and end walls, said end walls being curved to be disposed about said journal, one of said end walls being removable; and means in said cellar including portions extending upwardly from the bottom thereof and spaced inwardly from said side walls to provide a relatively deep central chamber, and having portions extending laterally to provide relatively shallow side compartments; grease carrying mechanism mounted for vertical movement in said central compartment and normally urged into contact with said journal, said grease carrying mechanism being detachably mounted in said central compartment and held in position by said removable end plate, said grease carrying mechanism being detachable when said end plate is removed from its normal operative position.

11. In a device of the character described, the combination with a journal; of a grease cellar; a grease dispensing attachment having automatically operated grease distributing mechanism associated therewith, and including elements extending upwardly from the bottom of said cellar to provide a central compartment for the automatic grease distributing mechanism, and including elements extending laterally from said central compartment; and means adapted to cooperate with said laterally extending elements to vary the vertical height of said grease dispensing attachment with respect to said cellar.

12. In a device of the character described, the combination with a driving box and a journal; of a cellar comprising side, bottom and end walls, said end walls being arranged to be disposed about said journal, and one of said end walls being arranged to open and close the end portion of said cellar; an attachment having partitions defining a relatively narrow central chamber and side chambers, a grease-dispensing plate at the top of the central chamber associated with said attachment, a resiliently impelled member adapted to force the grease plate against the journal when a cake of grease is inserted between said plates; and means for attaching the cellar to the driving box, said central chamber being adapted to have a grease cake inserted therein when the end of said cellar is open and without disturbing the attachment between the cellar and the driving box.

13. In a device of the character described, the combination with a journal; of a cellar comprising side, bottom and end walls, said end walls being arranged to be disposed about said journal, and one of said end walls being arranged to open and close the end portion of said cellar; a grease dispensing attachment comprising distributing means automatically urged toward said journal; and means for adjusting the vertical height of said attachment to accommodate the same to cellars of different depths, said attachment being held in said cellar by the movable end wall when the same is in operative position, said grease distributing mechanism being removable for the purpose of replenishing the grease supply independently of the remainder of the attachment and the cellar.

14. A grease cellar having side, bottom and end walls, providing a central compartment, said cellar having means extending laterally to each side of said central compartment to provide side compartments, the bottoms of which are defined by the bottom wall of the cellar, the end defining walls of said compartments being concave along their upper edges to fit about a journal; a dispensing device disposed in said central compartment and including a concave perforated plate having angular flanges thereon fitting between opposite walls of said central compartment, and adapted to fit against a journal, said device being adapted to contain lubricant; and means for forcing said lubricant through said perforated plate to said journal.

15. In combination with a locomotive driving box having depending spaced jaws, a cast grease cellar proper adapted to be inserted between the driving box jaws and secured thereto, said cellar having a displaceable end wall and a single full width chamber therein; and a sheet metal grease-dispensing attachment insertible within said chamber of the cellar proper, said attachment having vertically extending spaced partitions defining a centrally disposed, relatively narrow chamber for the reception of a grease cake, said central chamber being open at one end corresponding to the end of the cellar proper having a displaceable end wall, whereby a supply of grease may be inserted within the central chamber of the attachment without removing the cellar proper, said attachment also having means at each side of its central chamber extended to and cooperable with the side walls of the cellar proper whereby to maintain the attachment in position within the cellar proper.

16. In combination with a locomotive driving box having depending spaced jaws, a cast grease cellar adapted to be inserted between the driving box jaws and secured thereto, said cellar having a displaceable end wall; and a sheet metal grease-dispensing attachment insertible within said cellar, said attachment having vertically extending spaced partitions and a bottom partition defining a centrally disposed chamber for the reception of a grease cake, said central chamber being open at that end corresponding to that of the cellar having the displaceable end wall, whereby a supply of grease may be inserted within said central chamber of the attachment without removing the cellar proper, said attachment also having means extending laterally from the central chamber thereof to engage and cooperate with portions of said cellar to maintain the attachment positioned within the cellar.

17. A grease cellar for locomotive driving boxes, said cellar having vertically and laterally extending walls dividing the same into a central chamber and two side chambers, the central chamber being relatively deep and the bottom walls of said side chambers being disposed above the level of the bottom wall of the central chamber, the walls defining the side walls of the central chamber and separating it from the side chambers extending to the top of the central chamber substantially flush with the upper edges of the end walls of the cellar.

18. In combination with a locomotive driving box having depending spaced jaws, a grease cellar proper adapted to be inserted between the driving box jaws and supported in position, said cellar proper having a displaceable end wall; and a metal grease-dispensing attachment insertable within and removable from said cellar, said attachment having vertically extending spaced partitions and a bottom partition defining a chamber corresponding in length to that of the grease cellar proper and centrally disposed with respect to the latter and of materially lesser width than the space between the jaws of the driving box, said chamber being open at that end corresponding to that of the cellar having said displaceable end wall, whereby a supply of grease may be inserted within said chamber of the attachment without removing the cellar proper, and cooperating means on said attachment and cellar for maintaining the attachment with said chamber thereof centrally disposed.

In testimony whereof I affix my signature.

ABRAHAM L. MOLER.